United States Patent [19]

Lacher

[11] 3,983,324

[45] Sept. 28, 1976

[54] FULL DUPLEX DRIVER/RECEIVER
[75] Inventor: William Arthur Lacher, Lansdale, Pa.
[73] Assignee: Burroughs Corporation, Detroit, Mich.
[22] Filed: Mar. 31, 1975
[21] Appl. No.: 563,610

[52] U.S. Cl. .................................. 178/59; 178/70 R
[51] Int. Cl.² ......................................... H04L 5/14
[58] Field of Search .......... 178/58, 59, 70 R, 70 TS, 178/71 R, 73; 179/1 C, 2 C, 3, 4, 170 E, 170 T

[56] References Cited
UNITED STATES PATENTS

| | | |
|---|---|---|
| 3,381,089 | 4/1968 | Delanoy et al. .................... 178/70 R |
| 3,566,031 | 2/1971 | Carbone et al. ...................... 178/59 |
| 3,566,032 | 2/1971 | Carbone et al. ...................... 178/59 |

Primary Examiner—Thomas A. Robinson
Attorney, Agent, or Firm—Francis A. Varallo; Edward J. Feeney, Jr.; Kevin R. Peterson

[57] ABSTRACT

The present disclosure describes semiconductor devices and circuits for sending and receiving data at high speed between computer modules with excellent noise immunity and low drive power. The semiconductor circuits are arranged to send data single-ended and to receive data differentially. As is required for full duplex operation over a pair of wires, the circuit arrangements are such that a driver in a given driver/receiver module does not influence the incoming data.

10 Claims, 3 Drawing Figures

FULL DUPLEX DRIVER/RECEIVER

BACKGROUND OF THE INVENTION

In electronic systems such as data processing, it is necessary that data be communicated among the various modules which make up the system. A conventional method of sending data from one point to another involves the use of drivers and receivers and a single coaxial cable. Full duplex operation wherein data may be transmitted and received at the same time is possible with this arrangement. However, the signal level must be high enough so that the receiver will be biased well beyond any radiated noise. Concomitant with such high signal levels is the utilization of increased power. Another well known system of transmitting data overcomes the disadvantages of the single wire method by utilizing a differential drive and receiver scheme. This method achieves good common mode noise immunity, but cannot be used for full duplex operation.

The driver/receiver of the present invention overcomes the difficulties of both of the aforementioned techniques.

SUMMARY OF THE INVENTION

In accordance with the present invention, a driver/receiver is described which is capable of full duplex operation and which sends data single-ended, that is, drives a single line, but receives data differentially.

Transistor devices are used in the driver/receiver and the circuit arrangement is such that each driver/receiver module possesses a pair of circuit nodes. In operation, each driver/receiver module has its nodes connected by cable to an identical module. However, the interconnection involves the coupling of unlike rather than homologous nodes in the respective modules. No drive/receive control is required for this configuration. Data may be transmitted in either direction at any time. The driver in any given module does not influence the incoming data. Stated another way, the receiver in any driver/receiver module is designed to ignore the information being transmitted or put on the line by its associated driver.

In addition to its capability of full duplex operation, the driver/receiver module of the present invention incorporates the following desirable characteristics. It has very good common noise immunity. Due to its low voltage change on the line, it is useful for very high speed operation. Also, it uses minimum power due to its low level signals. Another attractive feature of the circuit is that if the interconnecting cables are disconnected, the data output is automatically returned to ground potential. This prevents spurious data from being outputted by the receiver.

Other features and advantages of the present invention will become apparent in the detailed description appearing hereinafter.

DESCRIPTION OF THE PREFERRED EMBODIMENT

Figure 1:
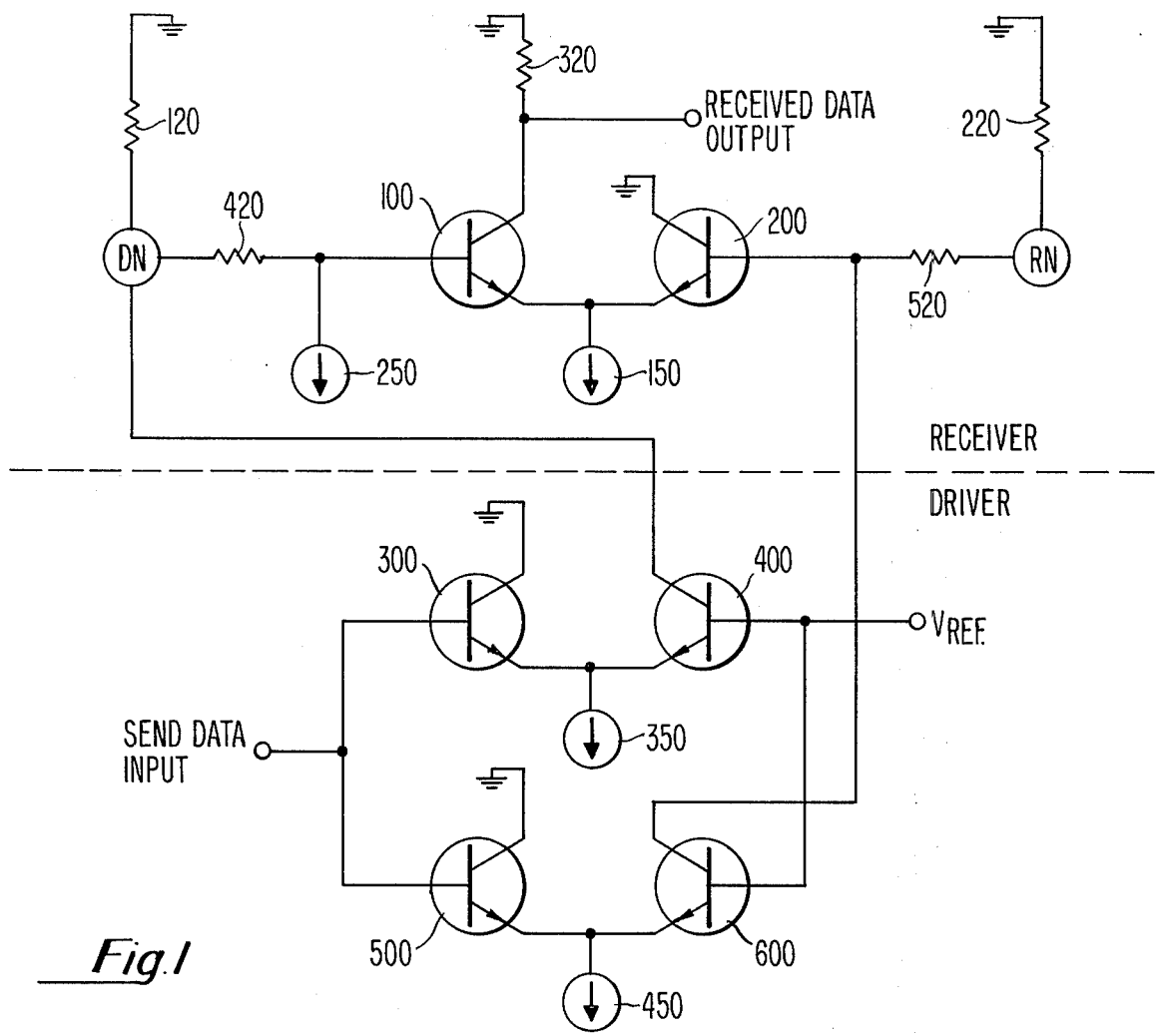
FIG. 1 is a simplified electrical schematic illustrating the basic concept of the driver/receiver module of the present invention.

The driver/receiver module contemplated by the present invention is depicted in highly simplified form in the electrical schematic of FIG. 1. This has been done to acquaint the reader with the basic circuit structure and its mode of operation. It should be noted, however, that the driver/receiver module depicted in FIG. 3 to be considered in detail hereinafter, represents an actual operative embodiment of the basic concept.

With reference to FIG. 1, a dashed line separates the components associated respectively with the driver and receiver functions. Two current amplifying devices represented by transistors 100 and 200 which are of the NPN conductivity type, appear in the receiver, while similar type transistors 300, 400, 500 and 600 are in the driver.

The circuit nodes DN (drive node) and RN (receive node) represent respectively the points at which information leaves and enters a given module. That is, the points are connected by wire to a second similar module at some distance. Information is transmitted to this second module via node DN of the first module, while information sent from the second module is received at node RN of the first module. Terminating impedances in the form of resistors 120 and 220 are connected from each node to ground potential.

Considering the receiver portion of the module, the transistors 100 and 200 appear as a differential amplifier operating as a current-mode switch. The respective emitter electrodes of these transistors are connected in common to a source of constant current 150. The collector electrode of transistor 100 is coupled to ground potential via resistor 320, while the collector of transistor 200 is connected directly to ground. The data of information received by the module appears on the Received Data Output terminal which is connected to the collector of transistor 100. An additional constant current source 250 is coupled to the base of transistor 100 which in turn is coupled to circuit node DN by a resistor 420. The base electrode of transistor 200 is coupled to circuit node RN by a resistor 520.

In the driver portion of the module, transistors 300 and 400 are also connected as a current-mode switch and have their emitter electrodes coupled in common to a third source of constant current 350. Transistors 500 and 600 are of similar circuit configuration and have their emitters connected in common to a fourth source of constant current 450. The collector electrodes of transistors 300 and 500 are connected to ground potential. The collector of transistor 400 is coupled to circuit node DN, while the collector of transistor 600 is coupled to the base of transistor 200 in the receiver portion of the module. The base electrodes of transistors 300 and 500 are coupled in common to the Send Data Input terminal to receive information to be transmitted by way of node DN to another like module. The base electrodes of transistors 400 and 600 are coupled in common to a source of reference potential available at the $V_{ref}$ terminal.

In operation, it is to be assumed that the data to be transmitted is in the form of logical 1's and 0's, and that these are represented respectively by distinct predetermined voltage levels. For example, a negative potential (such as −0.4 volts) and ground potential (no line current), may represent 1 and 0 respectively. Thus, in FIG. 1, if the data received by the module and appearing on node RN is a logical 0, and if the data to be sent and appearing on the Send Data Input terminal coupled to the base electrodes of transistors 300 and 500 is also a logical 0, both circuit nodes DN and RN will be substantially at ground potential. In order for the differential circuit of the receiver portion of the module to be pre-biased to a given state with both circuit nodes at substantially ground potential, the network comprised of current source 250 and resistors 120 and 420 is arranged to cause the base of transistor 100 to be more negative than that of transistor 200. Under these conditions, transistor 200 is switched ON, and transistor 100, OFF. Therefore, there is no current flow through resistor 320 and the collector of transistor 100 which as mentioned previously is connected to the Received Data Output terminal, is at ground potential.

Assume further that it is desired to have the driver of the module shown in FIG. 1 send a logical 1 via node DN to a second module, without affecting its receiver portion. Node RN remains at substantially ground potential, representative of the receipt of a logical 0 from the second module. The voltage level supplied to the Send Data Input terminal is representative of logical 1 data. This level is less positive than the reference potential on terminal $V_{ref}$, which is applied to the bases of transistors 400 and 600. In accordance with the current-mode operation, transistors 300 and 500 are shut off and conduction switches to transistors 400 and 600. Current from source 350, flowing through transistor 400 via resistor 120, pulls node DN more negative by a prescribed amount. At the same time, constant current source 450 flowing through transistor 600 via resistors 220 and 520, pulls the base of transistor 200 negative by the same prescribed amount. However, the base of transistor 100 continues to be biased more negatively than the base of transistor 200, by virtue of current flow originated at source 250. The net effect on the receiver differential stage as a result of the voltage levels attendant with the sending of a logical 1, is that the state of transistors 100 and 200 remain unchanged. Transistor 200 remains ON; transistor 100, OFF. The Received Data Output terminal remains at ground potential, thereby verifying that the transmission of a logical 1 by the driver portion of the module has had no effect on the receiver portion of the same module.

Figure 2:
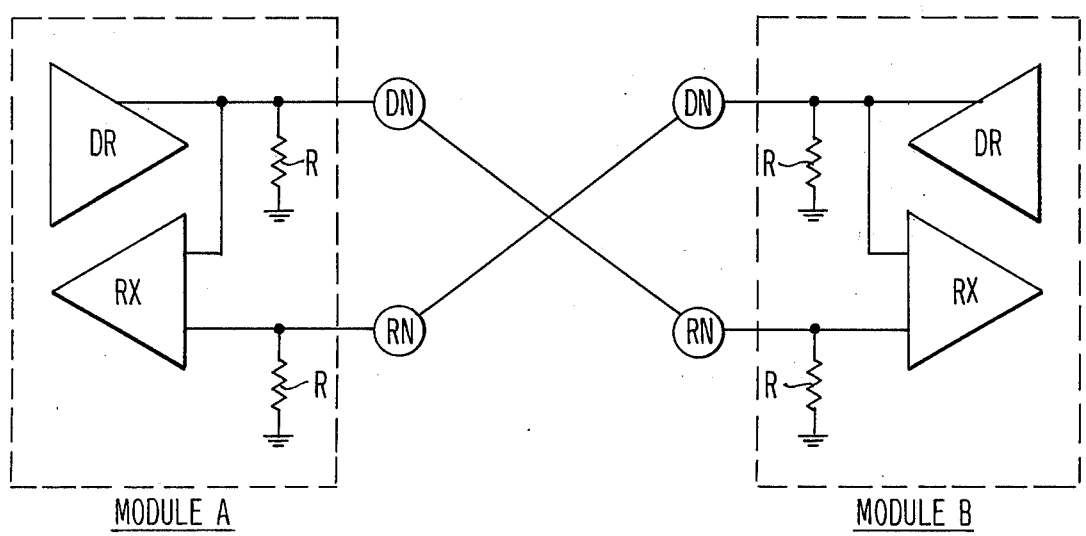
FIG. 2 is a logical schematic of the interconnection of a pair of driver/receiver modules.

The logical schematic of FIG. 2 illustrates the interconnection of two like driver (DR)/receiver (RX) modules of the type contemplated by the present invention. It is apparent that while each module receives information differentially, it drives single-ended. The resistors R are terminating impedances required for high frequency operation. An important inter-module wiring consideration is that the node DN of module A is connected to node RN of module B and vice versa. This is readily accomplished through proper wiring of the interconnecting cables.

Figure 3:
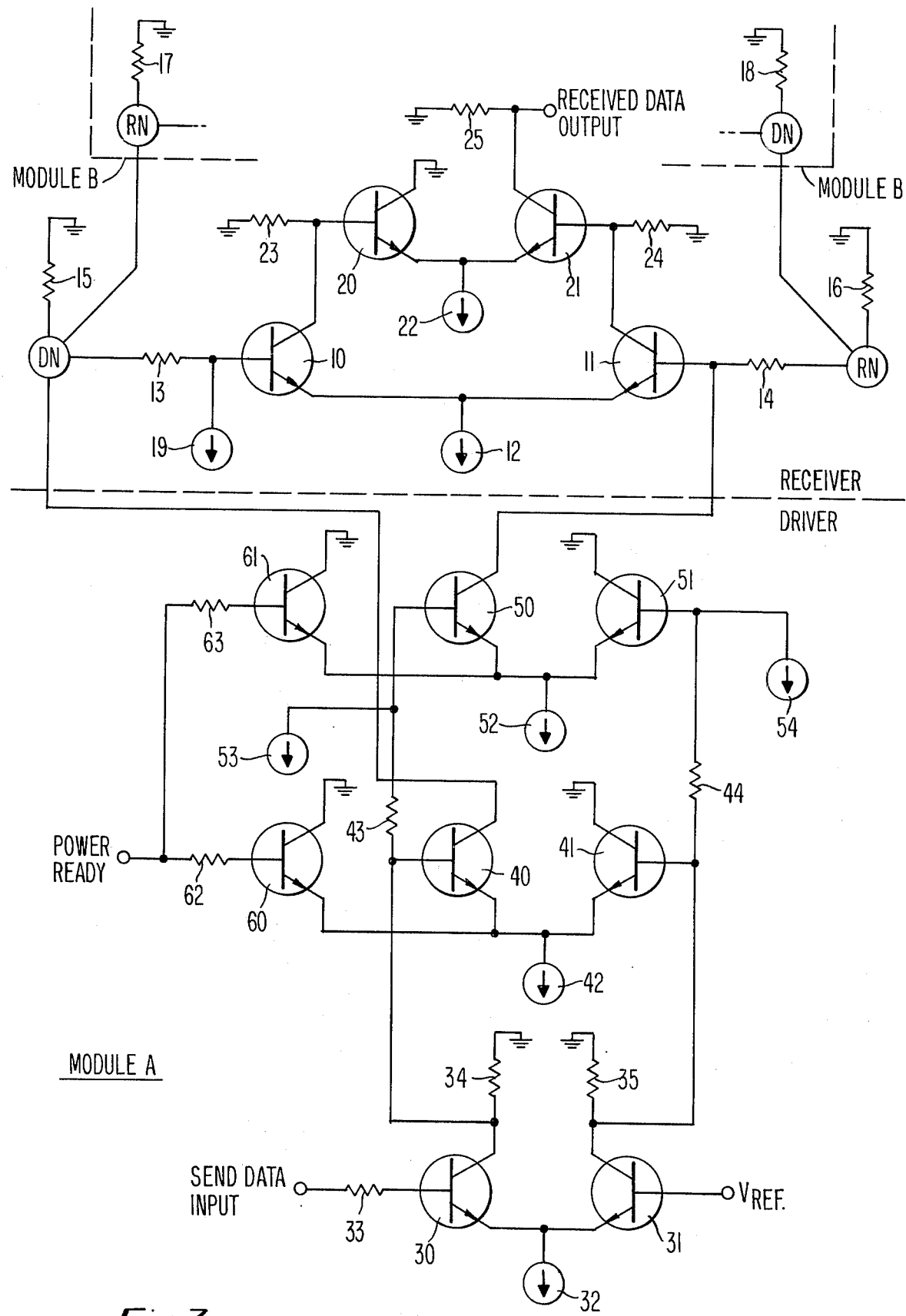
FIG. 3 is a more detailed electrical schematic embodying the basic concepts of the circuit of FIG. 1, but illustrating an actual operative embodiment of such concepts.

FIG. 3 is an electrical schematic of an actual operative embodiment of the present invention. As in FIG. 1, the dashed line separates generally the receiver and driver portions of the module, designated A. The nodes DN and RN are respectively the drive and receive nodes of this module. In accordance with FIG. 2, an identical module designated B is assumed to be connected to module A. The DN and RN nodes of module B, are shown connected to appropriate nodes of module A.

In the receiver portion of module A in FIG. 3, two pairs of transistors 10, 11 and 20, 21 are illustrated, each pair being connected in differential fashion. The respective emitter electrodes of transistors 10 and 11 are connected in common to a source of constant current 12. The bases of these transistors are coupled respectively through resistors 13 and 14 to nodes DN and RN of module A. The nodes in turn are coupled to ground potential via terminaing resistors 15 and 16. Nodes DN and RN of module B are returned to ground by way of resistors 17 and 18, respectively. A constant current source 19 is coupled to the base of transistor 10.

The second pair of differential amplifier transistors 20 and 21 have their emitter electrodes connected in common to a constant current source 22. The base electrodes of transistors 20 and 21 are connected respectively to the collector electrodes of transistors 10 and 11, and are also coupled to ground potential via resistors 23 and 24. The collector of transistor 20 is connected directly to ground, while the collector of transistor 21 is returned to ground by way of resistor 25. The Received Data Output terminal is coupled to the collector of transistor 21.

With regard to the driver portion of module A, three differential stages are involved. An input stage which comprises transistors 30 and 31 is adapted to receive the data to be sent (to module B) and to compare the level of the input signal with a reference potential. The emitters of transistors 30 and 31 are coupled to constant current source 32. The base of transistor 30 is coupled via resistor 33 to the Send Data Input terminal. The base of transistor 31 is connected to a reference potential at terminal $V_{ref}$. The collectors of transistors 30 and 31 are coupled to ground potential by way of resistors 34 and 35.

The remaining pairs of differential stages are adapted to be driven by the aforementioned input stage. Thus, transistors 40 and 41 form a differential stage, wherein the respective emitter electrodes are connected in common to current source 42. Transistors 50 and 51 are also connected in like fashion, with their emitters coupled to a source of constant curent 52. The base electrodes of transistors 40 and 50 in each of the differential stages are coupled to each other via resistor 43, and the base of the former transistor is connected to the collector of transistor 30 in the input stage. Similarly, the bases of transistors 41 and 51 are connected to each other by resistor 44 and the base of transistor 41 is connected to the collector of transistor 31 in the input stage. Current sources 53 and 54 are coupled respectively to the bases of transistors 50 and 51. The collectors of transistors 41 and 51 are returned to ground potential. The collector of transistor 40 is coupled to circuit node DN of module A while the collector of transistor 50 is coupled to the base of transistor 11.

An additional pair of transistors 60 and 61 are associated with a Power Ready circuit to prevent the driver from sending spurious information out of the module when circuit power is not at a predetermined level. Distinct voltage levels indicative of the condition of the power supply are applied to the Power Ready terminal. The latter is connected by way of resistors 62 and 63 respectively, to the bases of a pair of transistors 60 and 61. Resistors 62 and 63, as well as resistor 33, in the driver input stage, are included to prevent destruction of the transistor stages to which they are coupled should a positive potential inadvertently be applied to the Power Ready or Send Data Input terminals. Transistors 60 and 61 participate in the current mode switches by virtue of having their emitter electrodes connected in common respectively, with the emitters of transistors 40, 41 and 50, 51. The collectors of the Power Ready circuit transistors are grounded.

The operation of the driver/receiver illustrated in FIG. 3 will be described for each of the possible conditions in which module A is: (a) sending a logical 0 to module B and receiving a 0 therefrom, (b) sending a 1 and receiving a 1, (c) sending a 1 and receiving a 0, (d) sending a 0 and receiving a 1. In order to facilitate a description of the operation, nominal values of the voltage potentials present at various points in the circuit will be used. Also, the voltage levels corresponding to the logical 1 and 0 will be assumed to be −0.4 and 0 volts respectively. It should be emphasized however, that the voltage values in a particular embodiment may vary according to the design and application and that the levels given herein are included solely for purposes of example. Such values of voltage should in no way be considered limitative of the invention described and claimed herein.

a. Module A Sending a 0; Receiving a 0 from Module B

The Send Data Input terminal has applied to it zero volts corresponding to a logical 0. This potential appears on the base of transistor 30. A reference voltage of −0.2 volts is applied to the base of the opposite transistor 31 in the current switch. Under these conditions, transistor 30 is ON; transistor 31, OFF. Current from source 53 flows at all times through resistors 43 and 34. Similarly, current from source 54 flows through resistors 44 and 35. With the conduction of transistor 30, an additional current supplied by source 32 flows through collector resistor 34. The bases of transistors 40 and 50 are at −0.4 and −0.6 volts respectively, while the bases of transistors 41 and 51 are at −0.2 and −0.4 volts, respectively. Accordingly, transistors 40 and 50 are OFF; transistors 41 and 51, ON.

The collector of transistor 40 and nodes DN of module A and RN of module B are substantially at ground potential. Also, since module A is receiving a 0 (module B is sending a 0) node RN of module A and DN of module B are substantially at ground potential. The collector of transistor 50 and the base of transistor 11 are also at ground potential. Because of a bias potential of approximately −0.14 volts applied to the base of transistor 10 as a result of current flow from source 19, transistor 10 is OFF; transistor 11 is ON.

The base of transistor 20 is at ground potential, while that of transistor 21 is at −0.2 volts as a result of the collector current provided by source 12 and flowing through resistor 24. Thus, transistor 20 is ON; transistor 21, OFF. The Received Data Output terminal coupled to the collector of transistor 21 is at 0 volts or ground potential indicating the receipt by module A of a logical 0 from module B. It is also apparent that since module B is sending a 0 to module A and receiving a 0 therefrom, the voltage level and circuit conditions in module B are identical to those described for module A.

b. Module A Sending a 1; Receiving a 1 from Module B

Corresponding to the logical 1 a −0.4 volt signal is applied to the base of transistor 30 via the Send Data Input terminal and resistor 33. The operating conditions in this case are reversed from those previously described in connection with condition (a). The reference potential, −0.2 volts, on the base of transistor 31 is more positive than the −0.4 volts on the base of transistor 30. Current from source 32 is switched from transistor 30 to transistor 31. Since transistor 30 is OFF and transistor 31 is ON, the potentials appearing on the base of transistors 40 and 50 (−0.2 and −0.4 volts respectively) are more positive than those appearing on the bases of transistors 41 and 51, namely −0.4 and −0.6 volts. Transistors 40 and 50 are ON; transistors 41 and 51 are OFF.

The flow of collector current in transistor 40, derived from source 42 passing through the parallel terminating impedances 15 and 17, causes node DN of module A (and RN of module B) to go negative to about −0.3 volts. Since module A is receiving a 1 from module B, its node RN is also at approximately −0.3 volts. Coupled with the voltage drop generated by source 19, the voltage on the base of transistor 10 is approximately −0.44 volts. Collector current in transistor 50 flows through the terminating impedances 16 and 18 and resistor 14. The resulting potential on the base of transistor 11 is −0.6 volts. Under these conditions, transistor 10 will turn ON and transistor 11 will be OFF. Collector current flowing through resistor 23 will cause −0.2 volts to appear on the base of transistor 20, while the base of transistor 21 will be at ground potential. Transistor 20 is OFF; transistor 21, ON. Collector current in transistor 21 derived from current source 22 causes a −0.4 voltage drop across resistor 25 which is the output level on the Received Data Output terminal. The voltage levels and circuit conditions in module B are identical to those given for module A in the present case.

c. Module A Sending a 1; Receiving a 0 from Module B

The input voltage level on the Send Data Input terminal is again −0.4 volts. Conditions in the driver section of module A are identical to those described in condition (b). Transistors 31, 40 and 50 are ON; transistors 30, 41 and 51 are OFF. Node DN of module A is at approximately −0.3 volts and the base of transistor 10 is at −0.44 volts. In contrast to the preceding condition (b), node RN of module A (the DN node of module B) is substantially at ground potential. The collector current of transistor 50 causes a −0.3 volt potential to appear on the base of transistor 11. Since the base of the latter transistor is more positive than that of transistor 10, transistor 11 is turned ON, and transistor 10 ceases conduction. The base of transistor 20 is at ground potential and being more positive than that of transistor 21 (which is at −0.2 volts), transistor 20 turns ON, and transistor 21 is turned OFF. The level on the Received Data Output terminal is at ground potential.

d. Module A is Sending a 0; Receiving a 1 from Module B

The input voltage on the Send Data Input terminal is 0 volts. Conditions in the driver section are similar to those described in connection with condition (a). Transistors 30, 41 and 51 are ON; transistors 31, 40 and 50 are OFF. Node DN of module A is at approximately ground potential and the base of transistor 10 is at —0.14 volts. Node RN of module A at approximately —0.3 volts, the voltage level on the DN node of module B. This voltage appears also on the base of transistor 11. Since this latter voltage is more negative than that appearing on the base of transistor 10, the latter transistor conducts, and transistor 11 is turned OFF. This results in the turning OFF of transistor 20 and the conduction of transistor 21. The Received Data Ouput terminal is at —0.4 volts, indicating the receipt by the module A of a 1 from module B.

As to the "Power Ready" circuit which utilizes transistors 60 and 61, two distinct voltage levels are applied to the Power Ready terminal, namely, 0 volts, indicating the power source is inoperative, or —0.6 volts indicating the availability of normal power levels.

The operational states described hereinbefore presupposed that normal power supply conditions were in effect. The application of a —0.6 volt potential to the base electrodes of transistors 60 and 61 insured that each of the bases would be more negative than the bases of the pair of differentially connected transistors with which either transistor 60 or 61 is associated. Both of the last-mentioned transistors are OFF during normal operations.

However, if the power supply output is below normal, a 0 level appears on the Power Ready terminal and on the bases of transistors 60 and 61. Full conduction derived from current sources 42 and 52, is assumed in the latter transistors and transistors 40, 41 and 50, 51 are turned OFF. Under these conditions, the collector electrodes of transistors 40 and 50 are substantially at ground potential, thereby preventing the driver from sending out spurious information.

Another feature alluded to hereinbefore is that if the wires cross connecting the nodes of two like modules are disconnected, the Received Data Output terminal will always have the 0 voltage level thereon. This will be apparent from a consideration of the various data transfers described previously. The 1 output level on the Received Data Output terminal of a given module occurs only when a 1 is received from another module connected thereto. A cable disconnect between the two modules must necessarily result in the Received Output terminal being effectively grounded.

In conclusion, the full duplex driver/receiver taught by the present invention has proved highly reliable in actual operative systems. It should be understood that changes and modifications of the circuit organization presented herein may be needed to suit particular requirements. Such changes and modifications are well within the skill of the electronics circuit designer, and insofar as they are not departures from the true scope and spirit of the invention, are intended to be covered by the following claims.

What is claimed is:

1. A full duplex driver/receiver module comprising:
    a driver and a receiver portion;
    said receiver portion comprising a plurality of semiconductor current amplifying devices including a first differentially configured current-mode switch;
    said driver portion comprising a plurality of semiconductor current amplifying devices including second and third differentially configured current-mode switches;
    a drive node and a receive node within said module, the data being sent by said module and being received thereby appearing respectively on said drive and receive nodes, means coupling said drive and receive nodes respectively to the current amplifying devices of said first current-mode switch;
    an input stage comprising a pair of current amplifying devices configured as a fourth differential current-mode switch, the data being sent by said module being applied to one of said last mentioned current amplifying devices, the other of said current amplifying devices being coupled to a reference potential;
    each of said pair of current amplifying devices of said fourth current-mode switch being coupled to a current amplifying device in each of said second and third current-mode switches, the state of conduction of each of said last-mentioned devices being a function of the respective conductive states of the devices in said fourth current-mode switch, which states are in turn dependent upon said data being sent by said module;
    means coupling the outputs of a current amplifying device in each of said second and third current-mode switches respectively to said drive node and to the current amplifying device in said first current-mode switch which is coupled to said receive node;
    the state of conduction of the current amplifying devices in said first current-mode switch being a function of the data on said receive node, and being unaffected by the data being sent by said module and appearing on said drive node.

2. A driver/receiver as defined in claim 1 further including in
    said receiver portion a pair of current amplifying devices configured as a fifth differential current-mode switch, the current amplifying devices of said first current-mode switch being coupled respectively to the current amplifying devices of said fifth current-mode switch, the state of conduction of said latter devices being a function of the conductive states of the former devices, the output of one of said current amplifying devices in said fifth current-mode switch being indicative of data received by said module.

3. A driver/receiver as defined in claim 1 characterized in that said semiconductor current amplifying devices are transistors, each having an emitter, a collector, and a base electrode;
    the first and second transistors of said first current-mode switch having their emitters coupled in common to a first source of constant current, impedance means coupling the bases of said first and second transistors respectively to said drive and receive nodes, a second constant current source connected to the base of said first transistor, terminating impedances connected between each of said nodes and ground potential;
    the transistors of said second current-mode switch and the transistors of said third current-mode switch each having their emitters coupled in common to respective third and fourth sources of constant current.

4. A driver/receiver as defined in claim 3 further characterized in that the data being sent by said module is applied to the bases of a first of a pair of transistors in each of said second and third current-mode switches, the bases of a second of said transistors in each of said latter switches being coupled in common to a source of reference potential, the collector of said first transistors of said second and third current-mode switches being connected to ground potential, the collectors of said second transistors of said second and third current-mode switches being connected respectively to said drive node and to the base of said second transistor in said first current-mode switch, the collector of said last-mentioned transistor being connected to ground potential;

impedance means coupling the collector of said first transistor in said first current-mode switch to ground potential, the signal levels appearing on said latter collector being indicative of the data received by said module.

5. A driver/receiver as defined in claim 2 characterized in that said current amplifying devices are transistors, each having an emitter, a collector and a base electrode;

the first and second transistors of said first current-mode switch having their emitters coupled in common to a first source of constant current, impedance means coupling the bases of said first and second transistors respectively to said drive and receive nodes, a second constant current source connected to the base of said first transistor of said first current-mode switch, terminating impedances connected between each of said nodes and ground potential;

the transistors of said second current-mode switch and the transistors of said third current-mode switch each having their emitters coupled in common to respective third and fourth sources of constant current, the bases of the transistors in said second current-mode switch being coupled respectively to fifth and sixth sources of constant current;

the first and second transistors of said fourth current-mode switch having their emitters coupled in common to a seventh source of constant current;

the first and second transistors of said fifth current-mode switch having their emitters coupled in common to an eighth source of constant current.

6. A driver/receiver as defined in claim 5 including means for coupling the data being sent by said module to the base of said first transistor of said fourth current-mode switch, the base of the second transistor in said last mentioned switch being connected to a reference potential, impedance means coupling the respective collectors of the transistors in said fourth current-mode switch to ground potential;

impedance means coupling the bases of a first transistor in each of said second and third current-mode switches to each other, impedance means coupling the bases of a second transistor in each of said second and third current-mode switches to each other, the bases of said first and second transistors in said third current-mode switch being coupled respectively to the collectors of said first and second transistors in said fourth current-mode switch, the collectors of said second transistors in said second and third current-mode switches being connected to ground potential, the collectors of said first transistors of said second and third current-mode switches being coupled respectively to the base of said second transistor in said first current-mode switch and to said drive node;

impedance means coupling the bases of the first and second transistors in said fifth current-mode switch to ground potential, the bases of said latter transistors being connected to the respective collectors of said first and second transistors of said first current-mode switch, the collector of said first transistor in said fifth current-mode switch being connected to ground potential, impedance means coupling the collector of said second transistor in the last mentioned switch to ground potential, the signal levels appearing on said latter collector being indicative of the data received by said module.

7. A driver/receiver as defined in claim 6 further characterized in that said drive and receive nodes of said module are cross connected to the drive and receive nodes of a second like module.

8. A driver/receiver as defined in claim 7 wherein like-valued terminating resistors are coupled from the drive and receive nodes of both modules to ground potential.

9. A driver/receiver as defined in claim 6 further including a power ready circuit having first and second transistors, each having an emitter, a collector and a base electrode, the emitter of said power ready circuit first transistor being connected to the commonly coupled emitters of said second current-mode switch, the emitter of said power ready second transistor being connected to the commonly connected emitters of said third current mode switch, the collectors of both said power ready transistors being returned to ground potential, impedance means coupled respectively to the bases of said last mentioned transistors, terminal means coupled in common to said impedance means for applying a plurality of distinct voltage levels to the bases of said power ready circuit transistors, at least one of said voltage levels associated with acceptable power supply output biasing said power ready transistors to non-conduction and permitting normal conductive states in the transistors of said second and third current-mode switches, and another of said voltage levels associated with below normal power supply output causing the conduction of both said power ready transistors and the resultant non-conduction of the transistors in said second and third current-mode switches, the non-conduction of said latter transistors preventing the sending of data by said module.

10. A driver/receivier as defined in claim 9 characterized in that said transistors are all of the NPN conductivity type.

* * * * *